United States Patent [19]
Lin

[11] Patent Number: 6,030,006
[45] Date of Patent: Feb. 29, 2000

[54] SPRING BIASED CLAMPING DEVICE FOR FLANGED CONNECTIONS

[76] Inventor: Peter Lin, 525 Cardinal Dr., Dresher, Pa. 19025

[21] Appl. No.: 09/027,757

[22] Filed: Feb. 23, 1998

[51] Int. Cl.$^7$ ...................................................... F16L 23/00
[52] U.S. Cl. ........................... 285/411; 285/420; 24/205; 24/279
[58] Field of Search ..................... 285/409, 410, 285/411, 415, 420, 366, 367; 24/20.5, 24, 20 LS, 279 B; 292/256.75, 256.65; 220/326; 215/287; 16/308

[56] References Cited

U.S. PATENT DOCUMENTS

| | | | |
|---|---|---|---|
| 2,967,325 | 1/1961 | Herzfeld | 16/308 X |
| 4,568,115 | 2/1986 | Zimmerly | 285/411 |
| 4,657,284 | 4/1987 | Fiori | 285/39 |
| 5,018,768 | 5/1991 | Palatchy | 285/24 |
| 5,384,936 | 1/1995 | Van Walraven | 24/279 |
| 5,893,611 | 2/1999 | Munley et al. | 24/279 X |

FOREIGN PATENT DOCUMENTS 813192  5/1937  France .................................... 285/420

*Primary Examiner*—Lynne H. Browne
*Assistant Examiner*—Greg Binda
*Attorney, Agent, or Firm*—LaMorte & Associates

[57] ABSTRACT

A clamp device for joining a flanged connection. The clamp device has a plurality of arcuate segments, wherein each of the arcuate segments has two ends. A pivot couples at least one end of each arcuate segment to another of the arcuate segments to produce a chain of arcuate segments that extend from a first end to a second end. The chain of arcuate segments is configurable into an annular structure when the first end is brought into abutment with the second end. A torsion spring is disposed around each pivot. Each torsion spring acts to bias the arcuate segments into the configuration that produces the annular structure. A rocking bolt is coupled to the second end of the chain of arcuate segments. The rocking bolt is joined to the second end by a second pivot and is positionable throughout a predetermined range. A biasing element is provided for biasing the rocking bolt into one position within the predetermined range.

8 Claims, 4 Drawing Sheets

SPRING BIASED CLAMPING DEVICE FOR FLANGED CONNECTIONS

BACKGROUND OF THE INVENTION

1. Field of the Invention

The present invention relates to clamping devices, commonly known as pipe clamps, that are used to join together the flanged ends of two objects so that a fluid impervious seal is created between the opposing flanges. More particularly, the present invention relates to such clamping devices that are normally biased into a predetermined configuration by spring elements.

2. Description of the Prior Art

In the manufacture and processing of pharmaceutical products, dairy products and other materials that require a sanitary processing environment, it is common for materials to be pumped from between points using a network of fixed pipes. To introduce materials into the processing system, supply trucks or supply containers are coupled to one of the pipes in the system. In many instances, connections between supply containers and pipes are made by aligning and joining flanged connections. Flanged connections are also a very common method of interconnecting different segments of pipe within the system. A flanged connection is a termination that can be constructed at the end of a pipe or at a port of a container. The flanged connection is a circular flange that radially extends from a pipe or the neck of a container, wherein the flange extends outwardly in the same plane as the open end of the pipe or container. To join any two flanged connections together, the two flanges are placed in abutment so that the openings in the center of each of the flanges align. An O-ring or other sealer is place between the two flanges. The flanges are then clamped together in a manner that compresses the O-ring and prevents the flanges from falling out of alignment.

In the prior art, there are many different types of clamping mechanisms that have been used to join together flanged connections. Typically, the clamps that have been used are annular in shape. Hinges are disposed along the annular structure to enable the annular structure to open. The clamps are opened and are then closed over the span of the two adjoining flanges. The presence of the clamping device biases the adjoining flanges together and prevents the adjoining flanges from moving out of their aligned positions.

Prior art clamping devices with a single hinge are exemplified by U.S. Pat. No. 5,018,768 to Palatchy, entitled Pipe Coupling Hinge. Prior art clamping devices with multiple hinges are exemplified by U.S. Pat. No. 4,568,115 to Zimmerly, entitled Multi-Piece Pipe Clamp. Regardless of the number of hinges present, such prior art clamping device typically contain a rocking bolt that is pivotably connected to one end of the clamp. A wing nut is positioned on the rocking bolt. The wing nut passes over a slot that is positioned on the opposite end of the clamp. By tightening the wing nut, the diameter of the clamp can be reduced and the clamp can be tightened over the flanged connections.

In many applications, small containers are coupled to pipes using flanged connections and clamps. To elevate the container to the pipe, the container must be supported by at least one hand. This leaves only one hand to manipulate the clamping device into place. To manipulate the clamp with one hand is very difficult and time consuming. Often the clamp is dropped or the contents of the container are spilled as a person juggles the container and the clamp into the proper position.

One of the reasons the prior art clamping devices are difficult to manipulate with one hand is because the two open ends of the clamp must be pulled together around the flanged connection. Once in close proximity, the rocking bolt at one end of the clamp must be passed into the slot at the opposite side of the clamp and the wingnut on the rocking bolt must be tightened. These maneuvers are difficult with one hand and require that the clamping device be balanced on the flanged connection as the hand releases the clamp at one point and moves to engage the clamp at another point.

In the prior art, clamping devices have been developed that were intended to reduce the complexity of applying a clamping device over a flanged connection. One such prior art device is described in U.S. Pat. No. 4,657,284 to Fiori, entitled Remotely Manipulatable Clamp. In this patent, a clamp is disclosed that is capable of being set in place of removed by a robotic arm in a hazardous environment such as with a nuclear reactor. The clamp device is biased in a closed condition and can be temporarily opened by being compressed with robotic grippers. The Fiori device shows a clamp that will hold itself in place, however, with only one hand a person would find it very difficult to open the clamp, set it in position, set the rocking bolt into position and tighten the wingnut on the rocking bolt.

A need therefore exits in the art for a clamping device to join flanged connections that can be easily set in place with the manipulations of one hand. This need is met by the present invention as described and claimed below.

SUMMARY OF THE INVENTION

The present invention is a clamp device for joining a flanged connection. The clamp device has a plurality of arcuate segments, wherein each of the arcuate segments has two ends. A pivot couples at least one end of each arcuate segment to another of the arcuate segments to produce a chain of arcuate segments that extend from a first end to a second end. The chain of arcuate segments is configurable into an annular structure when the first end is brought into abutment with the second end. A torsion spring is disposed around each pivot. Each torsion spring acts to bias the arcuate segments into the configuration that produces the annular structure.

A rocking bolt is coupled to the second end of the chain of arcuate segments. The rocking bolt is joined to the second end by a second pivot and is positionable throughout a predetermined range. A biasing element is provided for biasing the rocking bolt into one position within the predetermined range.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
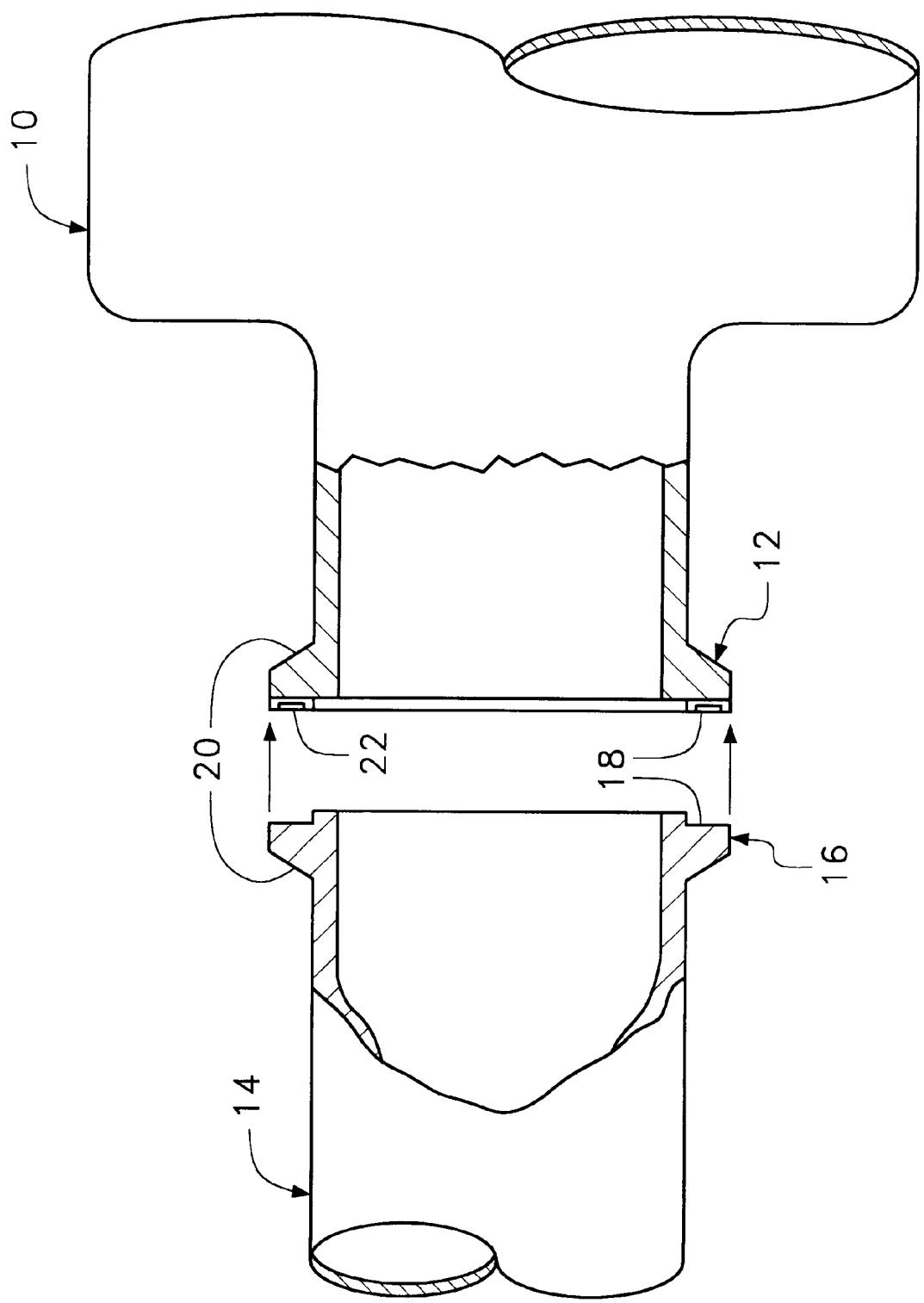
FIG. 1 is a selectively cross-sectioned view of a flanged connection between a container and a supply pipe to illustrate the environment of use for the present invention.

Referring to FIG. 1, there is shown a typical prior art container 10 with a flanged connection 12. The container 10 is positioned adjacent a pipe 14 that leads into some piping network. The pipe 14 also contains a flanged connection 16. The flanged connection 12 on the container 10 and the flanged connection 16 on the pipe 14 have the same general shape. Each flanged connection 12, 16 has a flat face surface 18 that faces the opposing flanged connection. The rear surface 20 of each flanged connection 12, 16 is sloped. When the two flanged connections 12, 14 are joined together, the face surfaces 18 abut and the sloped rear surfaces 20 form a frustrum shaped structure. An O-ring 22 is disposed between the opposing face surfaces 18, thereby creating the desired seal.

Figure 2:
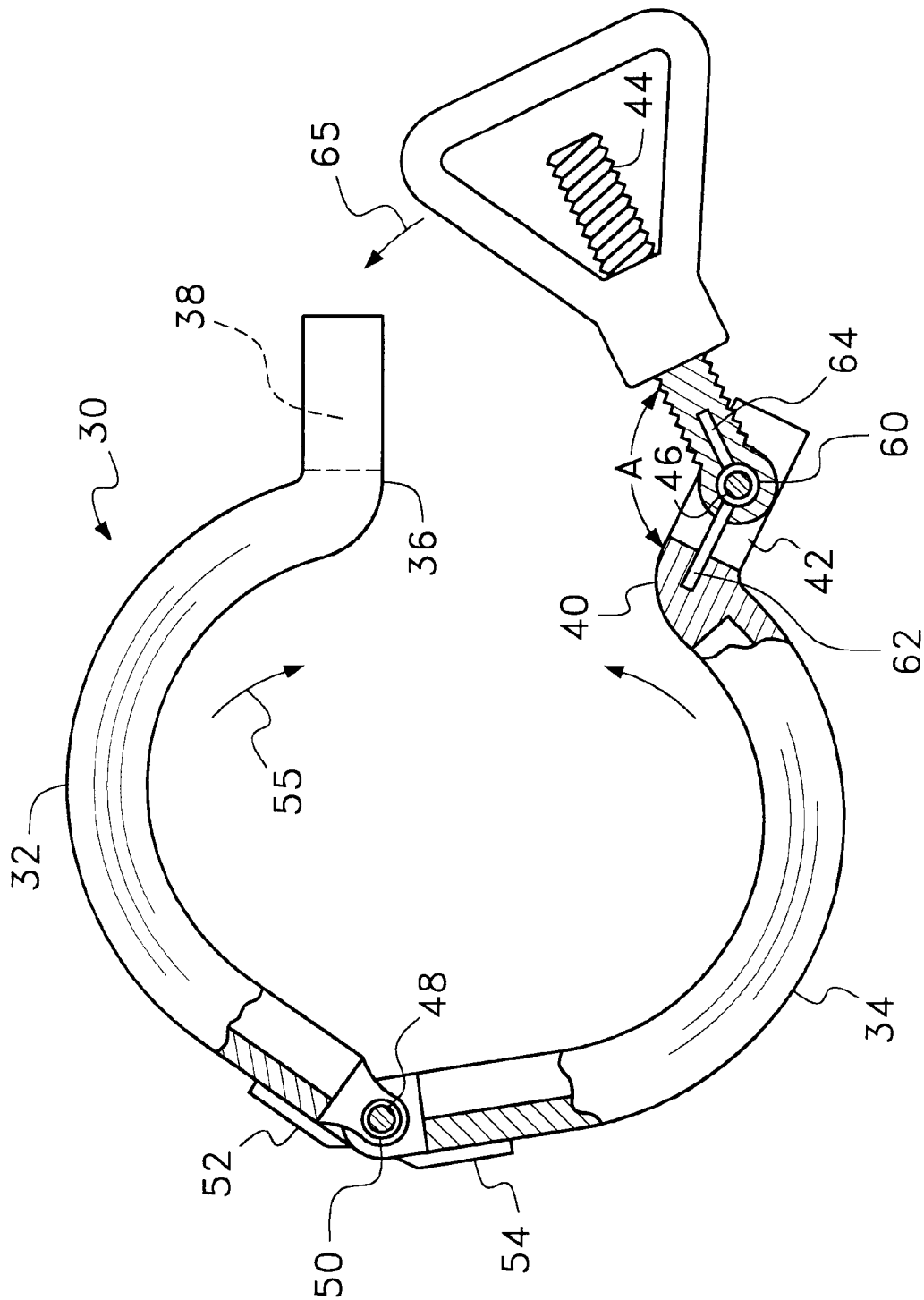
FIG. 2 is a selectively cross-sectioned side view of an clamp device in accordance with the present invention, the embodiment is shown in a condition between open and closed.

The present invention is a clamping device that extends around the two flanged connections 12, 16 when in abutment. The clamping device biases the face surfaces 18 together, thereby compressing the O-ring 22 and creating the desired seal. Referring to FIG. 2, a first exemplary embodiment of a clamp device 30 is shown in accordance with the present invention. From FIG. 2, it can be seen that the clamp device 30 contains at least two arcuate segments 32, 34. The arcuate segments 32, 34 are joined together, thereby forming a structure that can be configured into generally annular shape. The first arcuate segment 32 terminates with a leg section 36 that extends away from the center or radius for the arcuate segment 32. A slot 38 (shown with hidden lines) is formed in the center of the leg section 36, as is common in prior art clamping devices. The second arcuate segment 34 also contains a leg section 40 that defines a slot 42. However, the base of a rocking bolt 44 is positioned within the slot 42. The base of the rocking bolt 44 is connected to the second arcuate segment 34 by a pivot 46. The pivot 46 enables the rocking bolt 44 to rotate freely within the range of the slot 42.

In the embodiment of FIG. 2, the first arcuate segment 32 is connected to the second arcuate segment 34 at a pivot 48. This enables the first arcuate segment 32 and the second arcuate segment 34 to move relative to one another between an open condition and a closed condition. In FIG. 2, the clamp device 30 is shown between an open condition and a closed condition. An open condition is shown on FIG. 3 and a closed condition is shown in FIG. 4.

In FIG. 2, it can be seen that a torsion spring 50 is located at the pivot 48 between the first arcuate segment 32 and the second arcuate segment 34. The torsion spring 50 has a first arm 52 that engages the first arcuate segment 32 and a second arm 54 that engages the second arcuate segment 34. The torsion spring 50 biases the clamp device 10 into a closed condition. As a result, the torsion spring 50 biases the first arcuate segment 32 toward the second arcuate segment 34 in the direction of arrow 55. Similarly, the torsion spring 50 biases the second arcuate segment 34 toward the first arcuate member 32 in the direction opposite that of arrow 55.

A torsion spring 60 is also positioned around the pivot 46 that joins the base of the rocking bolt 44 to the second arcuate segment 34. The torsion spring 60 has one arm 62 that engages the second arcuate segment 34 and a second arm 64 that engages the shaft of the rocking bolt 44. The torsion spring 60 biases the rocking bolt 44 in the direction of arrow 65 to a point were the angle A between the rocking bolt 44 and the arm section 40 of the second arcuate segment 34 is acute.

Figure 3:
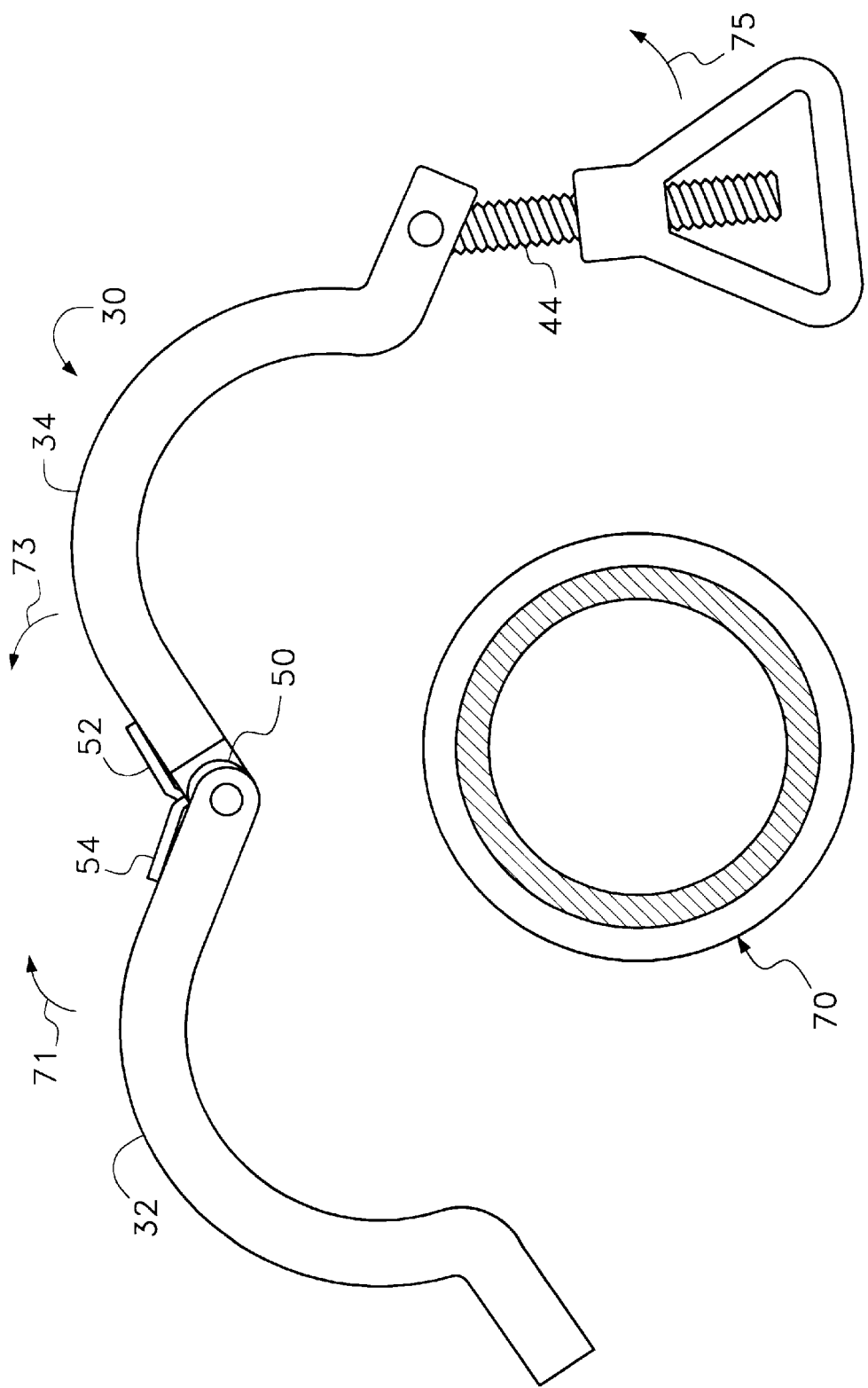
FIG. 3 is a side view of the embodiment of FIG. 2 shown in an open condition with a flanged connection.
Figure 4:
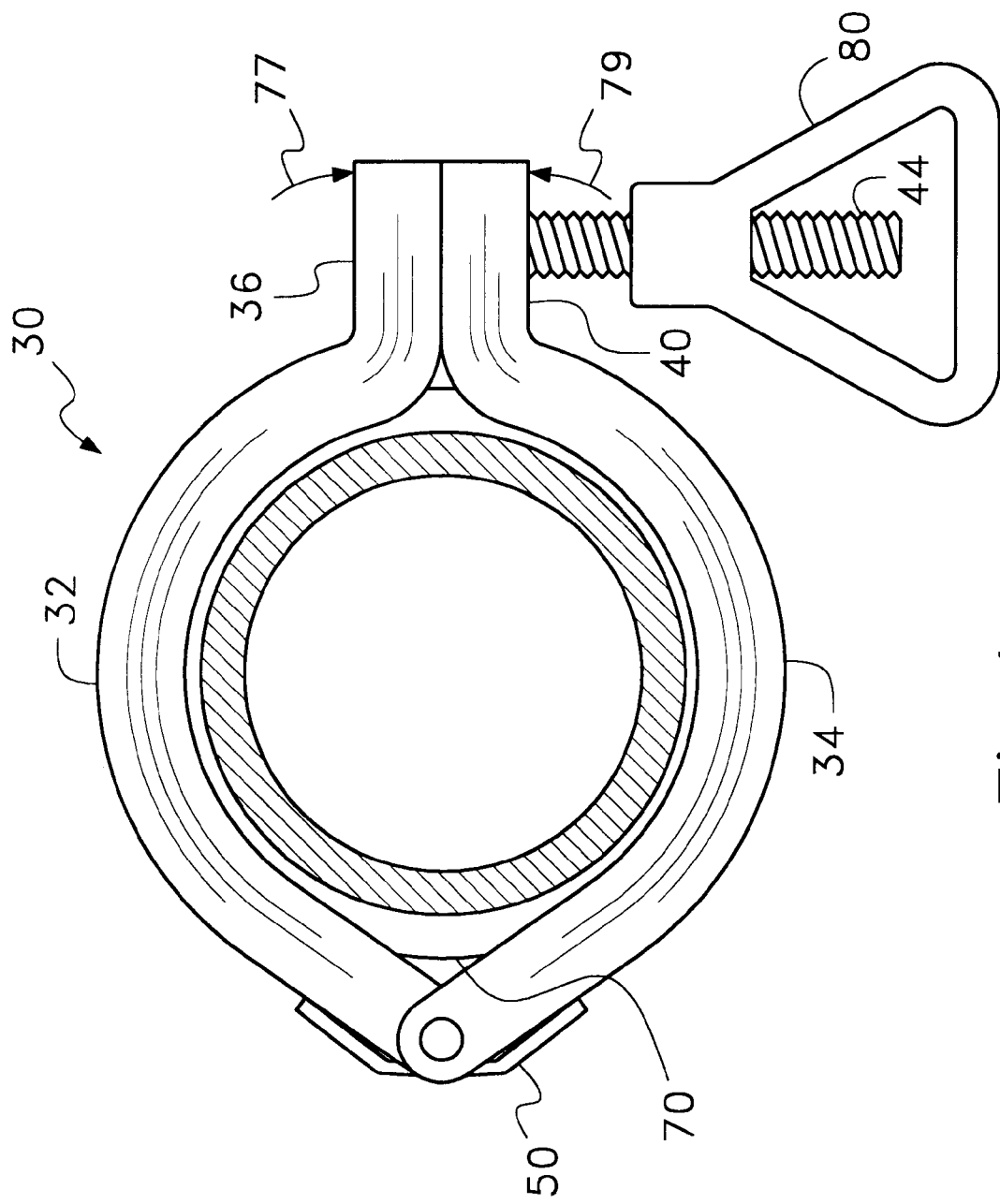
FIG. 4 is a side view of the embodiment of FIG. 2, shown in a closed condition, wherein the clamp device is closed around a flanged connection.

Referring to FIG. 3, it can be seen that to apply the clamp device 30 over a flanged connection 70, the first arcuate segment 32 and the second arcuate segment 34 must be rotated away from one another, thereby creating an opening wide enough for the flanged connection 70 to pass. To open the clamp device 30, the first arcuate segment 32 is rotated in the direction of arrow 71 and the second arcuate segment 34 is rotated in the direction of arrow 73. Such a manipulation acts against the bias of the torsion spring 52 that is positioned between the first arcuate segment 32 and the second arcuate segment 34.

Additionally, to move the rocking bolt 44 out of the way, the rocking bolt 44 must be rotated in the direction of arrow 75. This manipulation acts against the bias of the torsion spring 60 (FIG. 2) that engages the rocking bolt 44. The manipulation needs to spread the two arcuate segments 32, 34 and move the rocking bolt 44 out of the way can easily be done with one hand. The thumb is used to push the rocking bolt 44 to the side, while the remaining fingers spread the two arcuate segments together 32, 34 by pressing the arcuate segments 32, 34 against the palm.

Once manipulated into a fully open position, as shown in FIG. 3, then the open clamping device 30 can be position around a flanged connection 70. Once a person's hand is removed from holding the clamp device 30 open, the clamp device 30 automatically returns to a closed position due to the bias of the various torsion springs.

Referring to FIG. 4, it can be seen that once released, the clamp device reverts to a closed condition. The first torsion spring 50 biases the first arcuate segment 32 in the direction of arrow 77 and the second arcuate segment 34 in the direction of arrow 79. As a result, the two leg sections 36, 40 of the two arcuate segments 32, 34 abut against each other and complete an annular enclosure around the flanged connection 70. Furthermore, the second torsion spring 60 (FIG. 2) biases the rocking bolt 44 into the slot 38 (FIG. 2) on the opposing element. As a result, the clamping device 30 can be released and it will not fall away from the flanged connection 70. A person, with only one hand, can therefore release the clamp device 30 and tighten the wingnut 80, thereby setting the clamp device 30 into place.

In the embodiment of FIGS. 2–4, the clamp device 30 was comprised of only two arcuate segments 32, 34. However, in the prior art, there are clamp devices made of three and four arcuate segments. The technology of the present invention can be adapted to a clamp structure that has any plurality of arcuate segments. To do so, a torsion spring is added to every pivot point so that at every pivot point the various arcuate segments are biased into a closed condition. In this manner, regardless to the number of arcuate segments used, the clamp device will automatically revert to a closed condition when placed around a flanged connection.

It will be understood that the various figures described above illustrate only one preferred embodiment of the present invention. A person skilled in the art can therefore make numerous alterations and modifications to the shown embodiment utilizing functionally equivalent components to those shown and described. For example, there are numerous types of spring elements and spring configurations that can be substituted for the torsion springs described. All such modifications are intended to be included within the scope of the present invention as defined by the appended claims.

What is claimed is:

1. A clamp device for a flanged connection, comprising:
   a plurality of arcuate segments containing a first arcuate segment and a last arcuate segment, wherein said plurality of arcuate segments are joined together by at least one first pivot that enables said plurality of arcuate segments to be manipulated between an open condition and a closed condition, whereby said plurality of arcuate segments form an annular structure when in said closed condition;

a rocking bolt coupled to said last arcuate segment at a second pivot, wherein said rocking bolt is positionable around said second pivot in a range between a first position and a second position;

a slot defined in said first arcuate segment, wherein said slot receives at least part of said rocking bolt therein when said rocking bolt is at said first position and said plurality of arcuate segments are in said closed condition;

a torsion string disposed at each said first pivot, wherein each torsion spring that has a first arm that engages one of said plurality of arcuate segments and a second arm that engages a second of said plurality of arcuate segments and biases the arcuate segments into said closed condition; and at least one second spring element disposed proximate said second pivot for biasing said rocking bolt into said first position.

2. The device according to claim 1, wherein said at least one second spring is a torsion spring that has a first arm that engages said last arcuate segment and a second arm that engages said rocking bolt.

3. An improved clamping device for clamping together a flanged connection, said clamping device comprising:

a string of arcuate segments having a first end and an opposite second end, wherein arcuate segments are pivotably joined together at at least one point between said first end and said second end by at least one pivot;

a rocking bolt coupled to said second end of said string of arcuate segments, wherein said rocking bolt is joined to said second end by a second pivot and is positionable throughout a predetermined range; and a torsion spring disposed around said second pivot for biasing said rocking bolt into one position in said predetermined range.

4. The device according to claim 3, wherein said string of arcuate segments can be oriented into an annular configuration, whereby said fist end of said string of arcuate segments abuts against said second end of said arcuate segments.

5. The device according to claim 4, further including at least one second biasing element for biasing said string of arcuate segments into said annular configuration.

6. The device according to claim 4, wherein said first end of said string of arcuate segments defines a slot that accepts said rocking bolt when said rocking bolt is biased into said set position and said arcuate segments are in said annular configuration.

7. A clamp device, comprising:

a plurality of arcuate segments, wherein each of said arcuate segments has two ends;

a pivot coupling at least one end of each arcuate segment to another of said arcuate segments, thereby producing a chain of said arcuate segments that extend from a first end to a second end, said chain of arcuate segments being configurable into an annular structure when said first end is brought into abutment with said second end; and a torsion spring disposed around each said pivot, wherein each said torsion spring acts to bias said arcuate segments into said annular structure;

a rocking bolt coupled to said second end of said chain of arcuate segments, wherein said rocking bolt is joined to said second end by a second pivot and is positionable throughout a predetermined range; and a biasing element for biasing said rocking bolt into one position in said predetermined range.

8. The device according to claim 7, whereon said biasing element is a torsion spring disposed around said second pivot.

* * * * *